(12) United States Patent
Chen (10) Patent No.: US 11,716,010 B2
(45) Date of Patent: Aug. 1, 2023

(54) DRIVING CONTROL CIRCUIT, METHOD AND DEVICE FOR GALLIUM NITRIDE (GAN) TRANSISTOR, AND MEDIUM

(71) Applicant: Zhuhai Ismartware Technology Co., Ltd., Zhuhai (CN)

(72) Inventor: Haipeng Chen, Zhuhai (CN)

(73) Assignee: Zhuhai Ismartware Technology Co., Ltd., Zhuhai (CN)

( * ) Notice: Subject to any disclaimer, the term of this patent is extended or adjusted under 35 U.S.C. 154(b) by 0 days.

(21) Appl. No.: 17/851,741

(22) Filed: Jun. 28, 2022

(65) Prior Publication Data

US 2023/0170786 A1 Jun. 1, 2023

(30) Foreign Application Priority Data

Dec. 1, 2021 (CN) .......................... 202111445682.3

(51) Int. Cl.
*H02M 1/08* (2006.01)
*H02M 3/335* (2006.01)
*H02M 1/00* (2006.01)

(52) U.S. Cl.
CPC ........... *H02M 1/08* (2013.01); *H02M 1/0009* (2021.05); *H02M 3/33507* (2013.01)

(58) Field of Classification Search
CPC ..... H02M 1/009; H02M 1/08; H02M 3/33507
USPC ......................................... 327/108, 109, 110
See application file for complete search history.

(56) References Cited

U.S. PATENT DOCUMENTS

| 2020/0091827 A1* | 3/2020 | Chen ................. H02M 3/33507 |
| 2020/0112241 A1* | 4/2020 | Wang ................. H02M 3/33569 |

* cited by examiner

*Primary Examiner* — William Hernandez
(74) *Attorney, Agent, or Firm* — Cook Alex Ltd.

(57) ABSTRACT

The present disclosure relates to a driving control circuit, method and device for a gallium nitride (GaN) transistor, and a medium. An ADriver pin and an electronic switch are added to an existing flyback power supply circuit. The electronic switch includes a first terminal connected to the ADriver pin, a second terminal connected between a driving resistor and a GaN transistor, and a third terminal connected between a current detection resistor and a current sense pin. By improving the driving control circuit and the driving control method for the GaN transistor, the present disclosure can effectively prevent the false turn-on problem due to high-frequency oscillation between the leakage inductance of the transformer and the parasitic capacitance after the GaN transistor is turned off, and drives the GaN transistor more reliably.

12 Claims, 7 Drawing Sheets

DRIVING CONTROL CIRCUIT, METHOD AND DEVICE FOR GALLIUM NITRIDE (GAN) TRANSISTOR, AND MEDIUM

CROSS REFERENCE TO RELATED APPLICATION(S)

This patent application claims the benefit and priority of Chinese Patent Application No. 202111445682. 3, filed on Dec. 1, 2021, the disclosure of which is incorporated by reference herein in its entirety.

FIELD OF THE INVENTION

The present disclosure relates to the technical field of power electronics, and in particular to a driving control circuit, method and device for a gallium nitride (GaN) transistor, and a medium.

With advances in power electronic technologies and semiconductor materials, the power converter is developing toward a higher power density and a higher conversion efficiency, particularly in the consumer electronic field. For conventional silicon transistors, the switching frequency of the power converter usually ranges from tens of kilohertz to one or two hundred kilohertz. With the development of a third-generation wide-bandgap semiconductor, and particularly with the application of GaN transistors having a low on-resistance and a low parasitic capacitance, the switching frequency of the power converter has been improved to hundreds of kilohertz or even several megahertz. As the threshold voltage between the gate and the source of the turn-on GaN transistor is as low as 0.8-1 V, and the withstand voltage between the gate and the source of the GaN transistor is 7 V at maximum and much lower than the 20 V withstand voltage of the conventional silicon metal oxide semiconductor (MOS) transistor, high-frequency oscillation arising from parasitic inductance of the corresponding trace and package at the high switching frequency is of particular importance to control the GaN transistor.

At present, many flyback pulse-width modulation (PWM) controllers drive the GaN transistor by simply changing a driving voltage as 6 V, but this is far from solving other problems of the GaN transistor in direct driving. For the flyback PWM controllers in peak current mode control, the source of the GaN transistor is necessarily connected to a current detection resistor to control a peak current. Due to leakage inductance of the flyback high-frequency transformer, after the GaN transistor is turned off, the drain-source parasitic capacitance of the GaN transistor produces the high-frequency oscillation with the leakage inductance of the flyback high-frequency transformer, the parasitic inductance of the GaN transistor package and the parasitic inductance of the printed circuit board (PCB) trace. Because of the high-frequency oscillation, the source voltage of the GaN transistor is oscillated to about −1 V, such that the device is turned on falsely and burnt out.

Therefore, there is an urgent need to provide a driving control circuit, method and device capable of driving a GaN transistor reliably, and a medium.

SUMMARY OF THE INVENTION

An objective of the present disclosure is to provide a driving control circuit, method and device for a GaN transistor, and a medium, which improves the structure of the flyback power supply circuit and the driving control method for the GaN transistor, thereby preventing the false turn-on phenomenon due to a negative voltage produced by high-frequency oscillation, and driving the GaN transistor more reliably.

In order to achieve the above objective, the present disclosure provides the following technical solutions:

The present disclosure provides a driving control circuit for a GaN transistor, including a flyback power supply circuit and an electronic switch, where the flyback power supply circuit includes a control chip, a driving resistor, a GaN transistor and a current detection resistor; the control chip includes a Driver pin and a current sense (CS) pin; the driving resistor includes one terminal connected to the Driver pin, and the other terminal connected to a gate of the GaN transistor; a source of the GaN transistor is connected to the CS pin and one terminal of the current detection resistor; and the other terminal of the current detection resistor is grounded;

the control chip further includes an ADriver pin; and the electronic switch includes a first terminal connected to the ADriver pin, a second terminal connected between the driving resistor and the GaN transistor, and a third terminal connected between the current detection resistor and the CS pin; and during each driving control cycle of the GaN transistor, the following operation is performed:

the Driver pin of the control chip outputs a high level, and the ADriver pin outputs a low level; when a voltage on the CS pin reaches a preset limit value, the Driver pin outputs a low level, and the ADriver pin outputs the low level; after a delay of first dead time, the Driver pin outputs the low level, and the ADriver pin outputs a high level; until first preset time is reached, the Driver pin outputs the low level, and the ADriver pin outputs the low level; and a next driving control cycle is entered after a delay of second dead time.

The present disclosure provides a driving control method for a GaN transistor, including:

performing the following operation during each driving control cycle of a GaN transistor:

controlling a Driver pin of a control chip to output a high level, and an ADriver pin to output a low level; controlling, until a voltage on a CS pin of the control chip reaches a preset limit value, the Driver pin to output a low level, and the ADriver pin to output the low level; controlling, after a delay of first dead time, the Driver pin to output the low level, and the ADriver pin to output a high level; controlling, until first preset time is reached, the Driver pin to output the low level, and the ADriver pin to output the low level; and entering a next driving control cycle after a delay of second dead time.

The present disclosure provides a driving control device for a GaN transistor including:

a processor; and a memory, storing a computer-readable program instruction therein, where the computer-readable program instruction implements, when run by the processor, the above driving control method.

The present disclosure provides a computer-readable storage medium, storing a computer program thereon, where the computer program implements, when executed by a processor, steps of the driving control method.

According to the specific embodiments provided by the present disclosure, the present disclosure achieves the following technical effects:

According to the driving control circuit, method and device for a GaN transistor, and the medium provided by the present disclosure, an ADriver pin and an electronic switch are added to an existing flyback power supply circuit. The electronic switch includes a first terminal connected to the ADriver pin, a second terminal connected between a driving resistor and a GaN transistor, and a third terminal connected between a current detection resistor and a CS pin. During each driving control cycle of the GaN transistor, the Driver pin of the control chip outputs a high level, and the ADriver pin outputs a low level; when a voltage on the CS pin reaches a preset limit value, the Driver pin outputs a low level, and the ADriver pin outputs the low level; after a delay of first dead time, the Driver pin outputs the low level, and the ADriver pin outputs a high level; until first preset time is reached, the Driver pin outputs the low level, and the ADriver pin outputs the low level; and a next driving control cycle is entered after a delay of second dead time. By improving the driving control circuit and the driving control method for the GaN transistor, the present disclosure can effectively prevent the false turn-on problem due to high-frequency oscillation between the leakage inductance of the transformer and the parasitic capacitance after the GaN transistor is turned off, and drives the GaN transistor more reliably.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and persons of ordinary skill in the art may still derive other accompanying drawings from these accompanying drawings without creative efforts. The following accompanying drawings are not intentionally scaled to an actual size in an equal proportion, and the emphasis is to illustrate the gist of the present disclosure.

DETAILED DESCRIPTION OF ILLUSTRATIVE EMBODIMENT(S)

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without inventive efforts shall fall within the scope of protection of the present disclosure.

An objective of the present disclosure is to provide a driving control circuit, method and device for a GaN transistor, and a medium, and relates to drive and control on the GaN transistor in the alternating current (AC)-direct current (DC) converter. The present disclosure improves the structure of the flyback power supply circuit and the driving control method for the GaN transistor, thereby preventing the false turn-on phenomenon due to a negative voltage produced by high-frequency oscillation, and driving the GaN transistor more reliably.

To make the above-mentioned objective, features, and advantages of the present disclosure clearer and more comprehensible, the present disclosure is further described in detail below in conjunction with the accompanying drawings and specific embodiments.

Embodiment 1

Figure 1:
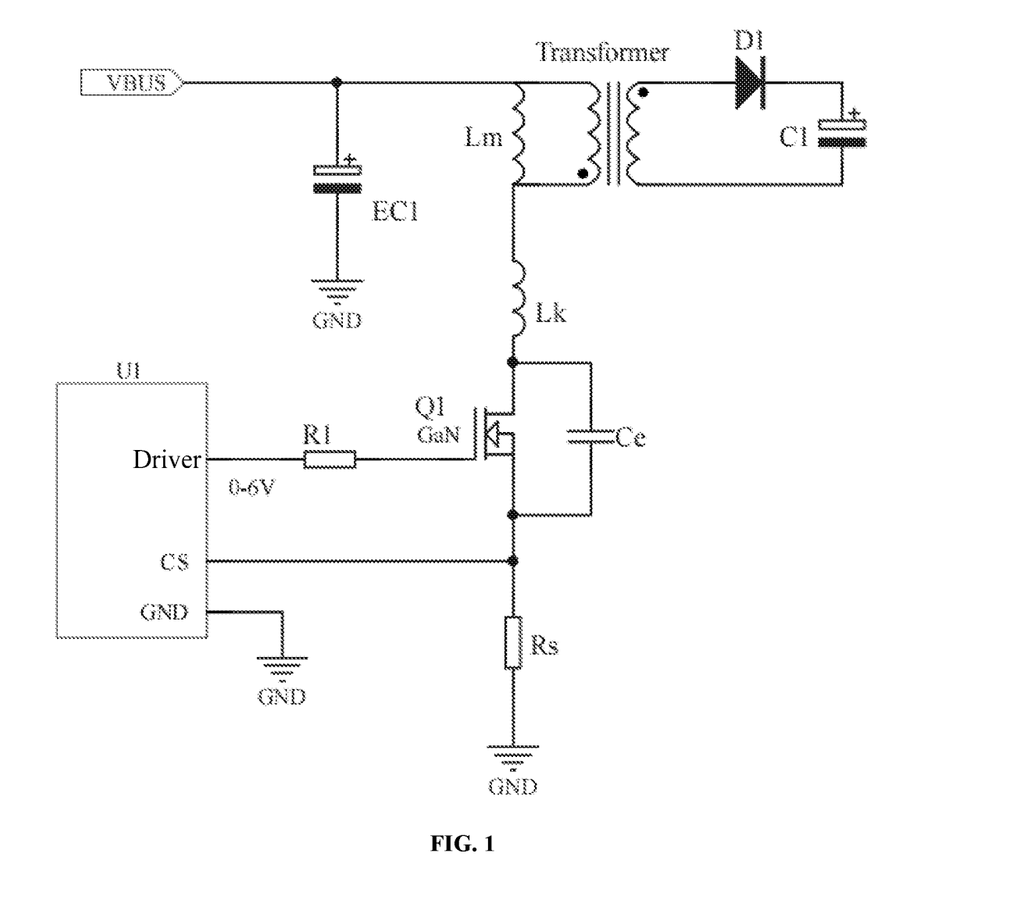
FIG. 1 is a schematic view illustrating a first driving circuit for driving a GaN transistor in the prior art according to Embodiment 1 of the present disclosure.

The conventional PWM controller is mainly configured to drive a silicon MOS device, with the driving voltage being 12 V. In contrast, the GaN transistor has a driving voltage of 6 V, and thus the GaN transistor cannot be driven by the conventional PWM controller. At present, many flyback PWM controllers drive the GaN transistor by simply changing a driving voltage as 6 V. FIG. 1 is a schematic view illustrating a first driving circuit for driving a GaN transistor in the prior art. On the basis of the existing flyback power supply circuit, the first driving circuit changes the output voltage on the Driver pin as 6 V, but this is far from solving other problems of the GaN transistor in direct driving. After the GaN transistor is turned off, the drain-source parasitic capacitance of the GaN transistor produces high-frequency oscillation with the leakage inductance of the flyback high-frequency transformer, the parasitic inductance of the GaN transistor package and the parasitic inductance of the PCB trace. Because of the high-frequency oscillation, the source voltage of the GaN transistor is oscillated to about −1 V, such that the device is turned on falsely and burnt out.

Figure 2:
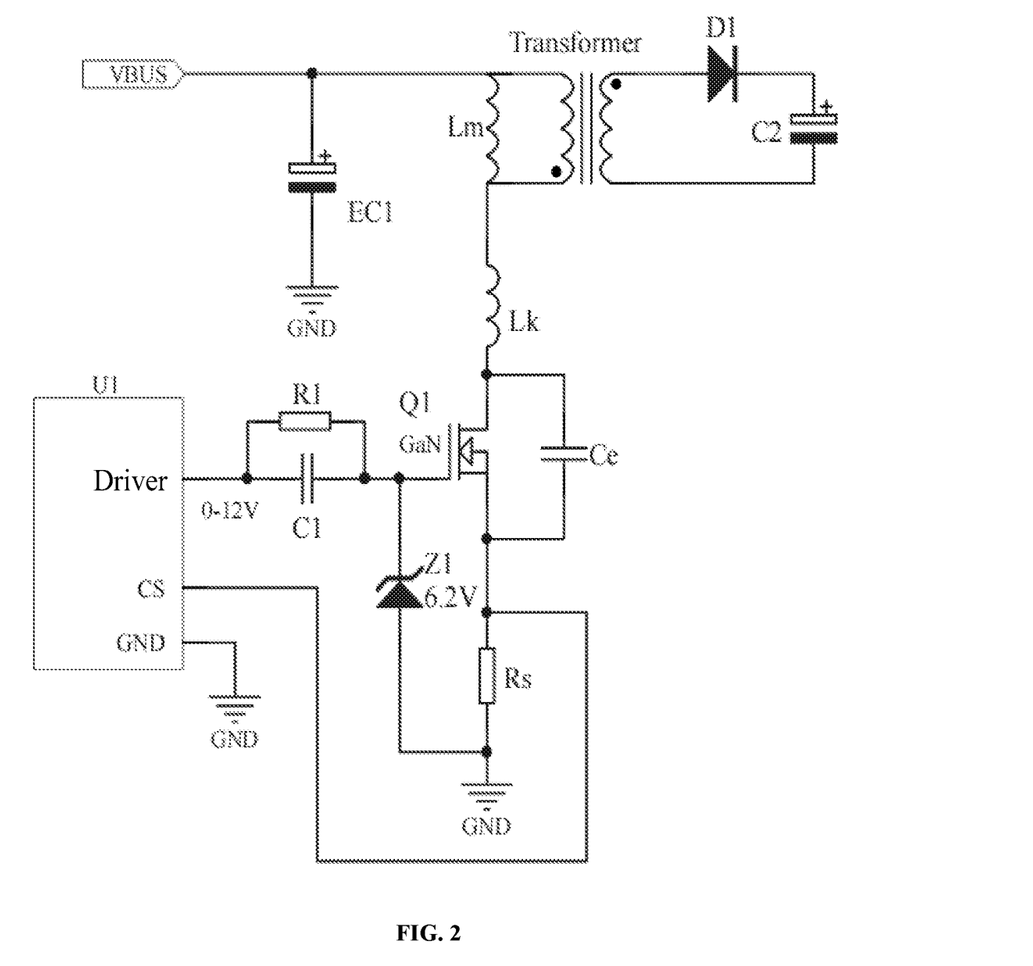
FIG. 2 is a schematic view illustrating a second driving circuit for driving a GaN transistor in the prior art according to Embodiment 1 of the present disclosure.

FIG. 2 is a schematic view illustrating a second driving circuit for driving a GaN transistor in the prior art. On the basis of the existing flyback power supply circuit, the second driving circuit drives the GaN transistor at a stable voltage and a negative voltage by externally connecting a capacitor C1 and a stabilivolt Z1. The method is compatible with the driver of the conventional silicon transistor, and the output voltage is still 12 V. However, both R1 and C1 discharge at fixed time. Under different loads and input voltages, the power supply changes a lot in operating frequency and duty cycle, and this is particularly true for the high-frequency quasi-resonant flyback controller. Therefore, it is hard for the method to become compatible with different frequencies and duty cycles.

Figure 3:
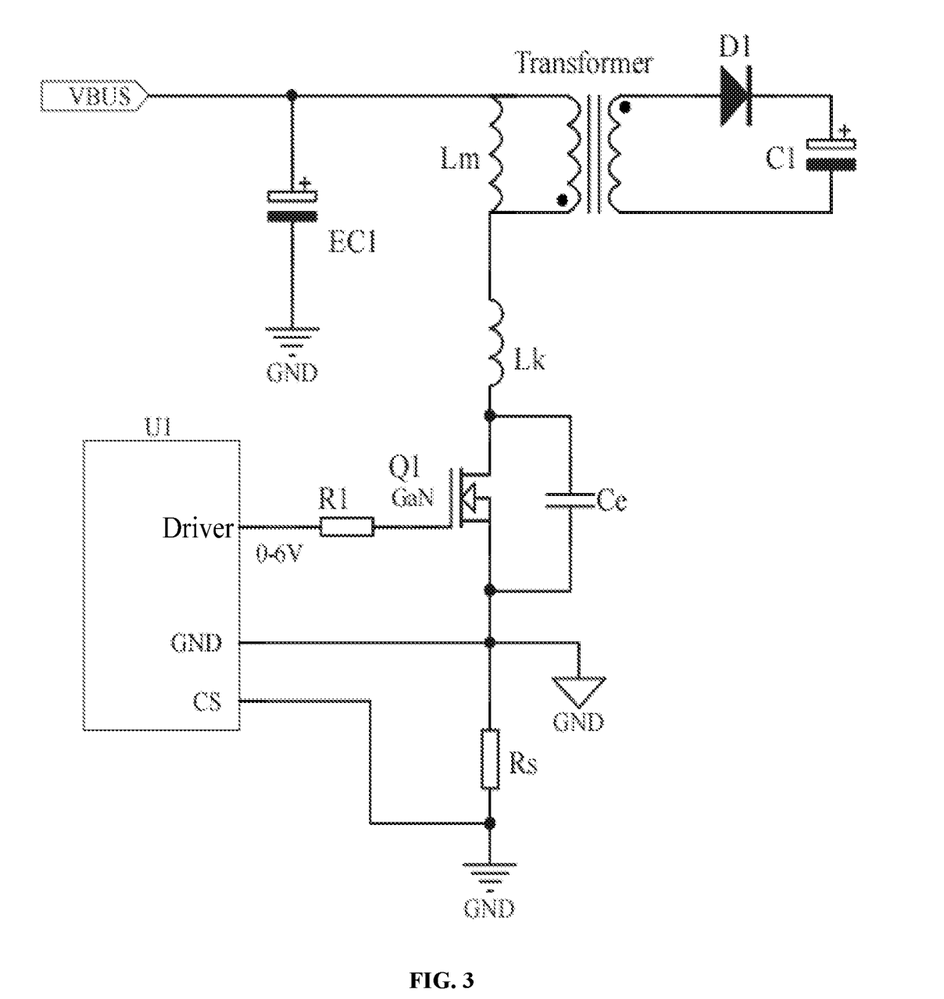
FIG. 3 is a schematic view illustrating a third driving circuit for driving a GaN transistor in the prior art according to Embodiment 1 of the present disclosure.

FIG. 3 is a schematic view illustrating a third driving circuit for driving a GaN transistor in the prior art. On the basis of the first driving circuit, the third driving circuit changes positions to which the CS pin and the GND pin are connected, and drives the GaN transistor with a negative-voltage sampling current. The method does not add the peripheral component and the chip pin. The reference ground pin (GND pin) of the control chip is directly connected to the source of the GaN transistor Q1, so the turn-off voltage is 0 V and the driving voltage of the GaN transistor Q1 is 0 V, which prevents the false turn-on problem due to a negative voltage produced by oscillation. Nevertheless, it is troublesome to sample and process the primary current.

In view of this, how to drive the GaN transistor reliably and conveniently is a problem to be solved urgently in the industry.

There are an enhancement GaN transistor and a depletion GaN transistor. The depletion GaN transistor is normally on, but is turned off with a negative voltage applied between the gate and the source. The enhancement GaN transistor is normally off, but is turned on with a positive voltage applied between the gate and the source. In the embodiment, the GaN transistor refers to the enhancement GaN transistor.

Figure 4:
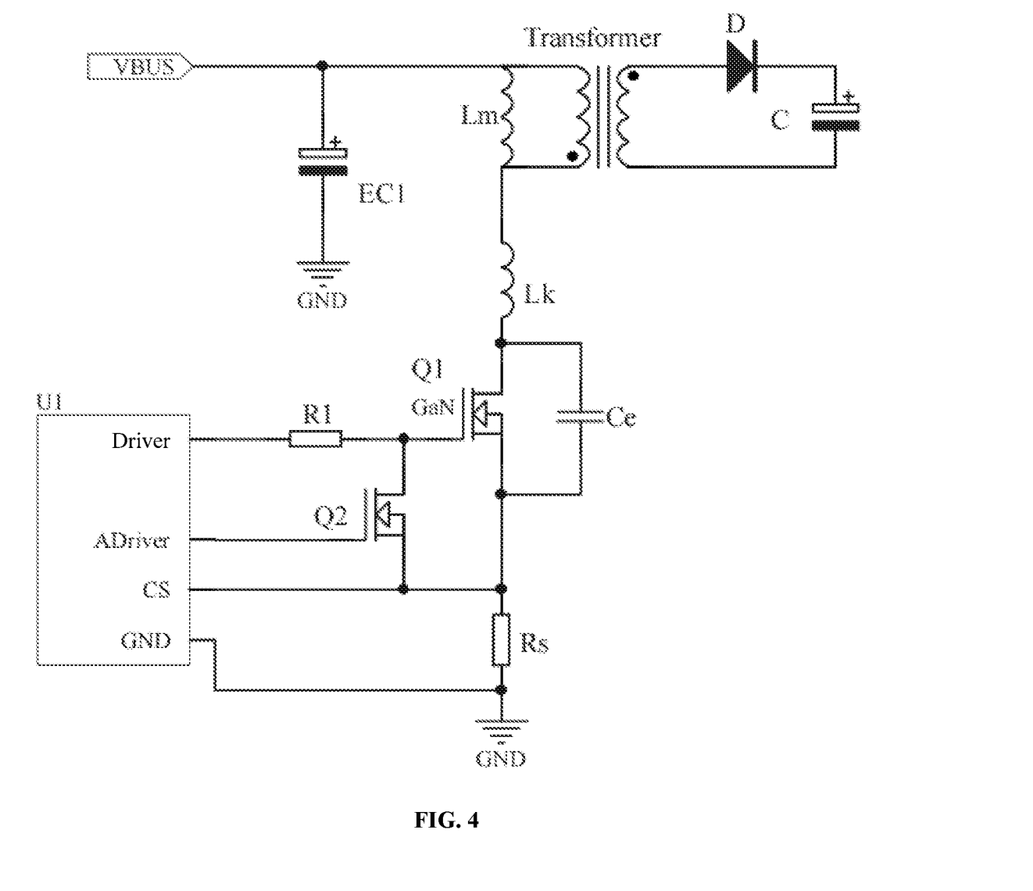
FIG. 4 is a schematic view illustrating partial connection of a driving control circuit according to Embodiment 1 of the present disclosure.

The embodiment provides a driving control circuit for a GaN transistor, which can drive the GaN transistor reliably and conveniently. As shown in FIG. 4, the driving control circuit includes a flyback power supply circuit and an electronic switch. The electronic switch may be a transistor and a triode. The flyback power supply circuit includes a control chip U1, a driving resistor R1, a GaN transistor Q1 and a current detection resistor Rs. The control chip U1 includes a Driver pin and a CS pin. The driving resistor R1 includes one terminal connected to the Driver pin, and the other terminal connected to a gate of the GaN transistor Q1. A source of the GaN transistor Q1 is connected to the CS pin and one terminal of the current detection resistor Rs. The other terminal of the current detection resistor Rs is grounded. In FIG. 4, VBUS is a voltage of an input electrolytic capacitor, EC1 is an energy storage filter electrolytic capacitor behind a bridge rectifier, Transformer is a flyback high-frequency transformer, Lm is a primary equivalent excitation inductance of the transformer, Lk is a leakage inductance of the transformer, D is an output rectifier diode, C is an output energy storage filter capacitor, and Ce is an equivalent parasitic capacitance for the GaN transistor Q1 and the flyback high-frequency transformer.

The control chip U1 further includes an ADriver pin. The electronic switch includes a first terminal connected to the ADriver pin, a second terminal connected between the driving resistor and the GaN transistor, and a third terminal connected between the current detection resistor and the CS pin. Specifically, when the electronic switch is the transistor, the transistor Q2 includes a gate connected to the ADriver pin, a drain connected between the driving resistor R1 and the GaN transistor Q1, and a source connected between the current detection resistor Rs and the CS pin. When the electronic switch is the triode, the triode includes a base connected to the ADriver pin, a collector connected between the driving resistor R1 and the GaN transistor Q1, and an emitter connected between the current detection resistor Rs and the CS pin.

The solutions in the embodiment are described below in detail by taking a general low-voltage transistor as the electronic switch for example.

Figure 5:
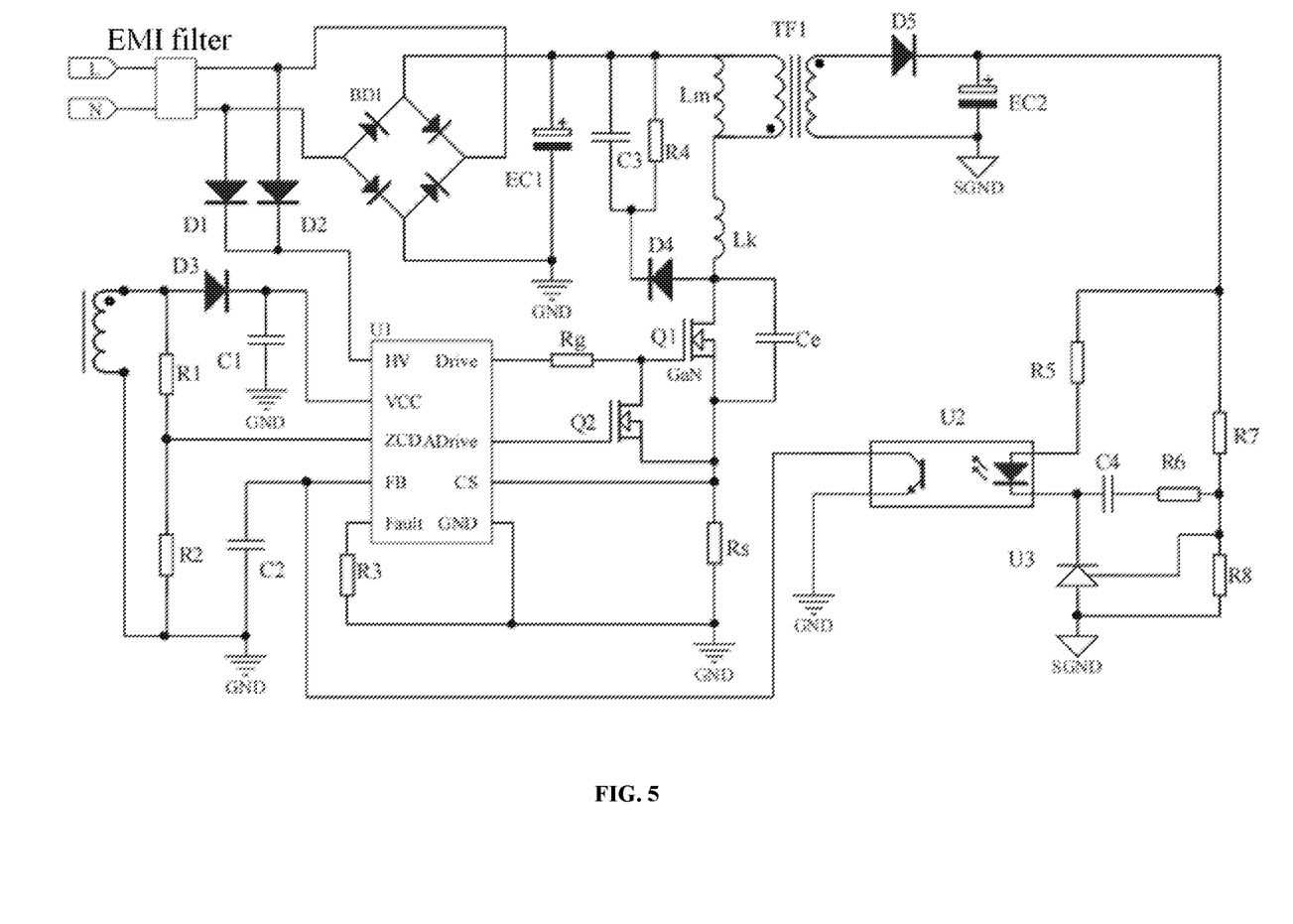
FIG. 5 is a schematic view illustrating overall connection of a driving control circuit according to Embodiment 1 of the present disclosure.

FIG. 5 is schematic view illustrating overall connection of the driving control circuit according to the embodiment. In the embodiment, the control chip U1 includes an HV pin, a VCC pin, a zero-current detection (ZCD) pin, an FB pin, a Fault pin, a Driver pin, an ADriver pin, a CS pin and a GND pin. The HV pin serves as a high-voltage startup pin, and is connected to a high-voltage startup circuit. In the high-voltage startup circuit, L and N are respectively a live wire and a neutral wire of a mains, and D1 and D2 each are a rectifier diode. With D1 and D2, the circuit is powered from the mains and rectified to implement high-voltage startup of the control chip U1. The VCC pin serves as a power supply pin in normal operation of the control chip U1, and is connected to a normal power supply circuit. In the normal power supply circuit, R1 and R2 are configured to divide a voltage on a power supply winding of the transformer to implement overvoltage protection as well as zero-crossing detection on the winding current, D3 is a rectifier diode for the power supply winding, and C1 is an energy storage filter capacitor. Through the power supply winding of the transformer, and with the rectification and filtration of D3 and C1, a normal operating voltage is provided for the control chip U1. The ZCD pin serves as an inductor current zero-crossing detection pin, and is connected to an inductor current zero-crossing detection circuit. In the inductor current zero-crossing detection circuit, a zero-crossing point of the inductor current is detected by dividing the voltage of the power supply winding with R1 and R2. The FB pin serves as an output voltage feedback pin, and is connected to an output voltage feedback circuit. With sampling, comparison and error amplification on the output voltage, the current of the optocoupler is controlled or isolated, thereby obtaining different voltages of the FB pin. The voltages of the FB pin are fed back to obtain output voltage variation information. In the output voltage feedback circuit, D5 is an output rectifier diode, and EC2 is an output energy storage filter capacitor. After divided and sampled by R7 and R8, the output voltage is provided for a reference voltage comparator U3. As the optocoupler, U2 is configured to isolate the primary side and the secondary side, transmit the control signal, and control the output voltage. R5 is a power supply current-limiting resistor of U3. C4, R6 and C2 are formed into a feedback adjustment circuit in the control loop. The Fault pin is connected to an over-temperature protection circuit. The over-temperature protection circuit is configured to implement an over-temperature protection function by externally connecting a thermistor R3. The GND pin serves as a reference ground pin of the control chip U1. The Driver pin serves as a driving control pin of the GaN transistor Q1. The ADriver pin serves as an auxiliary control pin of the GaN transistor Q1, and provides auxiliary control by externally connecting the transistor Q2. The CS pin serves as an inductor current sampling pin, and is connected to an inductor current sampling circuit. In the inductor current sampling circuit, the inductor current passes through the current detection resistor Rs to produce a voltage corresponding to the sampled current. The CS pin is configured to control energy transmission of the transformer, and implement over-current protection. In FIG. 5, BD1 is a bridge rectifier, and is configured to rectify the AC input mains. C3, D4 and R4 are peak absorption circuits, and are configured to absorb a peak oscillating voltage arising from the leakage inductance. TF1 is a flyback high-frequency transformer, and Rg is a driving resistor for controlling the switching speed and oscillation of the GaN transistor.

During each driving control cycle of the GaN transistor Q1, the following operation is performed:

1) The Driver pin of the control chip U1 outputs a high level, and the ADriver pin outputs a low level, such that the GaN transistor Q1 is turned on, and operates normally and stably. The primary equivalent excitation inductance Lm of the transformer and the leakage inductance Lk of the transformer store energy, and thus the voltage direction of the primary winding of the transformer is positive upward and negative downward.

2) Until a voltage on the CS pin reaches a preset limit value, the Driver pin outputs a low level, and the ADriver pin outputs the low level, such that the GaN transistor Q1 is turned off. The preset limit value is a voltage value obtained after a voltage on an FB pin of the control chip U1 is divided in the control chip U1. When the peak current passes through the current detection resistor Rs, a certain voltage is produced and sent to the CS pin of the control chip U1. Therefore, the peak current of the control chip U1 can be known through the voltage on the CS pin. The voltage on the FB pin is divided to some extent in the control chip U1. The divided voltage serves as the limited voltage on the CS pin, namely the limited voltage value.

3) After a delay of first dead time, the Driver pin outputs the low level, and the ADriver pin outputs a high level. After the GaN transistor is turned off, a current of the primary winding cannot change abruptly but charges the parasitic capacitance Ce of the GaN transistor Q1. After the delay of the first dead time, high-frequency oscillation is produced between the leakage inductance Lk of the transformer and the parasitic capacitance Ce, and thus a negative voltage is produced easily to falsely turn on the GaN transistor Q1. In view of this, the ADriver pin is introduced in the embodiment. The ADriver pin outputs the high level, such that the transistor Q2 is turned on, and the voltage on the gate and the source of the GaN transistor Q1 is controlled nearly at 0 V, thereby preventing the false turn-on phenomenon due to the negative voltage produced by the oscillation on Rs.

4) Until first preset time is reached, the Driver pin outputs the low level, and the ADriver pin outputs the low level. After a delay of second dead time, a next driving control cycle is entered. At the first preset time, the oscillation between the leakage inductance and the parasitic capacitance is attenuated greatly. The ADriver pin outputs the low level, such that the transistor Q2 is turned off. After the delay of the second dead time, the Driver pin of the control chip U1 outputs the high level, such that the GaN transistor Q1 is turned on again to enter the next driving control cycle.

Figure 6:
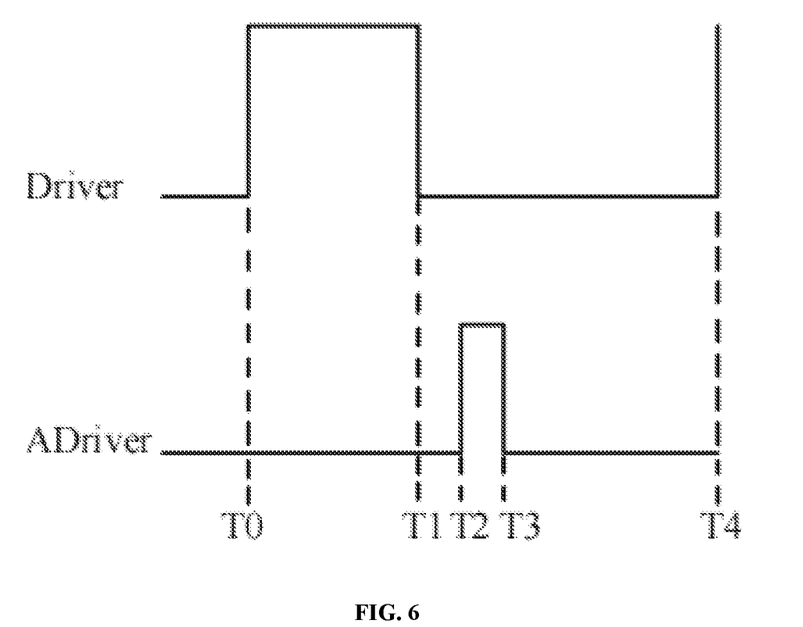
FIG. 6 is a schematic view illustrating an output level of an ADriver pin and a Driver pin within a driving control cycle according to Embodiment 1 of the present disclosure.

FIG. 6 is a schematic view illustrating an output level of an ADriver pin and a Driver pin within a driving control cycle. In FIG. 6, T0 refers to start time of the driving control cycle, T1 refers to time when the voltage on the CS pin reaches the preset limit value, T2 refers to time after the delay of the first dead time, T3 refers to the first preset time, and T4 refers to time after the delay of the second dead time and also start time of the next driving control cycle.

Figure 7:
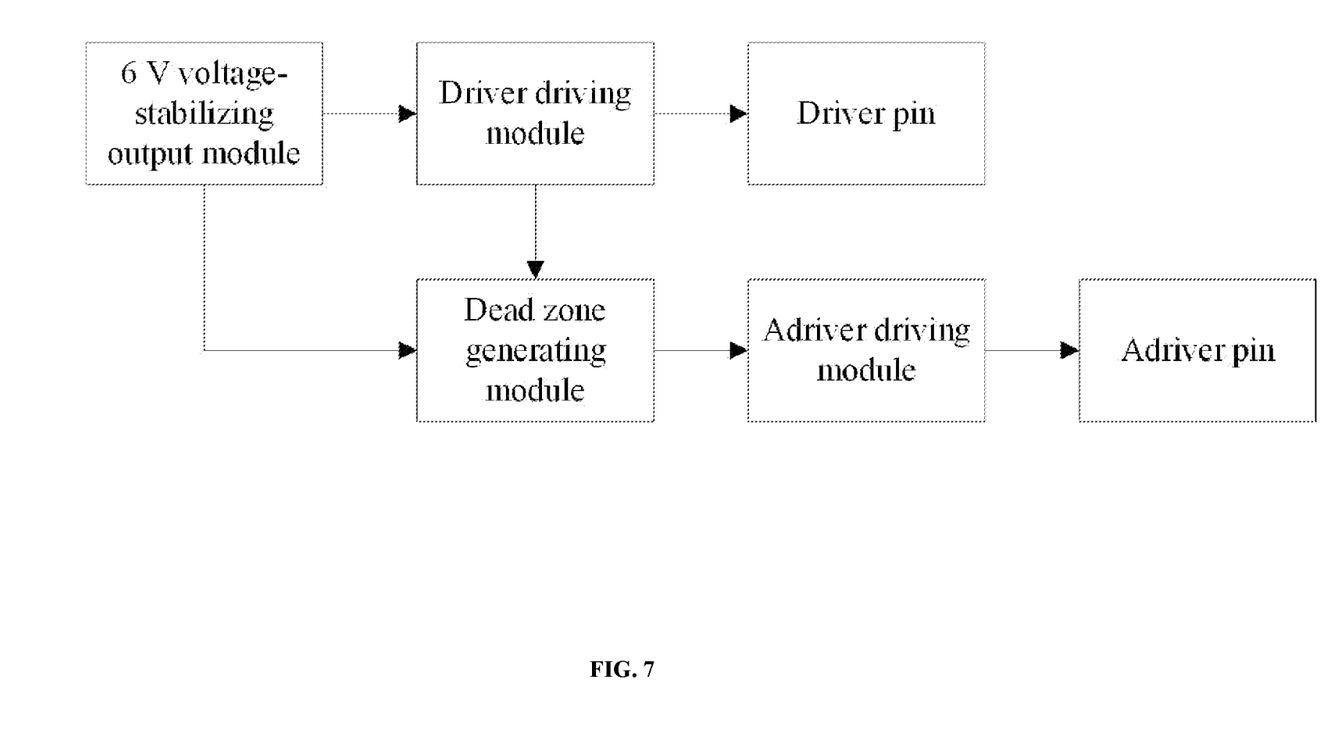
FIG. 7 is a schematic view illustrating an internal connection circuit of an ADriver pin and a Driver pin according to Embodiment 1 of the present disclosure.

FIG. 7 is a schematic view illustrating an internal connection circuit of an ADriver pin and a Driver pin. There are a 6 V voltage-stabilizing output module, a Driver driving module, a dead zone generating module and an ADriver driving module in the control chip U1. The 6 V voltage-stabilizing output module is connected to the Driver driving module and the dead zone generating module. The Driver driving module is connected to the dead zone generating module. The dead zone generating module is further connected to the ADriver driving module. The Driver driving module is connected to the Driver pin. The ADriver driving module is connected to the ADriver pin. The 6 V voltage-stabilizing output module is configured to output the accurate voltage of 6 V. The Driver driving module is configured to drive the Driver pin to output the high and low levels. The ADriver driving module is configured to drive the ADriver pin to output the high and low levels. It is to be noted that the high level output by the Driver pin is 6 V, while the high level output by the ADriver pin is greater than 4 V and less than 20 V. For ease of driving, the high level output by the ADriver pin is also 6 V in the embodiment. The dead zone generating module is configured to generate the first dead time.

The first preset time and the second dead time depend on an operating mode of the control chip U1 in the embodiment. There are two operating modes for the control chip U1, including a continuous conduction mode (CCM) and a discontinuous conduction mode (DCM). In both the CCM mode and the DCM mode, the output voltage is affected by a load current. As for the former, the frequency is fixed, and the output voltage is mainly adjusted through the duty cycle. As for the latter, the output voltage is mainly adjusted through the switching frequency, and certainly, the duty cycle may also change correspondingly.

In response to the CCM mode of the control chip U1, the first preset time is determined according to a preset fixed time interval from the start time of the driving control cycle to the first preset time, and the second dead time is determined according to the preset fixed time interval and the driving control cycle. In the CCM mode, the control chip U1 has a fixed operating frequency, namely the driving control cycle is a fixed value, and the time interval from the time T0 to the time T4 is fixed. Considering that the time T3 when the ADriver pin outputs the high level is ahead of the time T4, another fixed time from the time T0 to the time T3 is introduced by the control chip U1, so as to reserve the second dead time between the time T3 and the time T4. Therefore, according to the preset fixed time interval from the start time (time T0) of the driving control cycle to the first preset time (time T3), the first preset time can be determined. Since the time interval from the time T0 to the time T4 is fixed, the second dead time can be determined according to the preset fixed time interval and the driving control cycle.

In response to the DCM mode of the control chip U1, the first preset time is time when an amplitude of oscillation detected by the ZCD pin of the control chip U1 is greater than a preset amplitude of oscillation, and the second dead time is a sum of an interval from the first preset time to time when the ZCD pin of the control chip U1 detects a zero voltage and a first preset time interval. The operating frequency of the chip in the DCM mode is a variable. From the time T0 to the time T1, the primary equivalent excitation inductance Lm of the transformer stores the energy. After the time T1, the primary equivalent excitation inductance Lm of the transformer is demagnetized. Upon completion of the demagnetization, Lm and Lk produce resonance with Ce, and the voltage on the power supply winding is oscillated greatly. The time T3 is time when the ZCD pin of the control chip U1 detects a large amplitude of oscillation, and in this case, the ADriver pin of the control chip U1 outputs the low level. From the time when the voltage on the power supply winding is oscillated greatly to the time when the voltage is oscillated to 0, the ZCD pin of the control chip U1 detects a zero-crossing voltage. Based on different loads, the control chip U1 delays the time (namely the first preset time interval) upon the zero-crossing detection of the ZCD, such that the Driver pin outputs the high level, namely the time T4.

Therefore, the embodiment can control the on and off of the GaN transistor Q1 well, regardless of the duty cycle or the operating frequency. The embodiment is simple and reliable. With accurate control on the voltage source and the dead zone, the embodiment can drive the GaN transistor Q1 reliably, and can effectively prevent the false turn-on phenomenon due to the high-frequency oscillation between the leakage inductance Lk of the transformer and the parasitic capacitance Ce after the GaN transistor Q1 is turned off. Furthermore, the embodiment has the desired adaptability to various changes of the operating frequency and the duty cycle. It neither affects the normal peak current sampling, nor processes the negative voltage sampling. In addition, the ADriver pin in the embodiment may also be composed of the Driver pin and the inverter, thereby constructing a driving circuit outside the chip to control the GaN transistor Q1. Therefore, the control method in the embodiment is applied to the GaN controller not only in the topology of the flyback power supply, but also in the topology of the active clamp, power-factor corrector and bridge resonator.

Embodiment 2

The embodiment provides a driving control method for a GaN transistor, including:

Perform the following operation during each driving control cycle of the GaN transistor:

Control a Driver pin of a control chip to output a high level, and an ADriver pin to output a low level; control, until a voltage on a CS pin of the control chip reaches a preset limit value, the Driver pin to output a low level, and the ADriver pin to output the low level; control, after a delay of first dead time, the Driver pin to output the low level, and the ADriver pin to output a high level; control, until first preset time is reached, the Driver pin to output the low level, and the ADriver pin to output the low level; and enter a next driving control cycle after a delay of second dead time.

The step of controlling, until a voltage on a CS pin of the control chip reaches a preset limit value, the Driver pin to output a low level, and the ADriver pin to output the low level may include:

Detect the voltage on the CS pin of the control chip in real time; determine whether the voltage on the CS pin reaches the preset limit value, the preset limit value being a voltage value obtained after a voltage on an FB pin of the control chip is divided in the control chip; control, if yes, the Driver pin to output the low level, and the ADriver pin to output the low level; and control, if no, the Driver pin to output the high level, and the ADriver pin to output the low level.

After the step of controlling the Driver pin to output the low level, and the ADriver pin to output a high level, the driving control method further includes: Determine an operating mode of the control chip at present; determine, if the control chip is in a CCM mode at present, the first preset time according to a preset fixed time interval from start time of the driving control cycle to the first preset time; detect in real time, if the control chip is in a DCM mode at present, an amplitude of oscillation detected by a ZCD pin of the control chip, and determine whether the amplitude of oscillation is greater than a preset amplitude of oscillation. Time when the amplitude of oscillation is greater than the preset amplitude of oscillation is the first preset time, and the first preset time is determined based on the operating mode of the control chip.

The step of entering a next driving control cycle after a delay of second dead time specifically includes:

Determine an operating mode of the control chip at present; determine, if the control chip is in a CCM mode at present, the second dead time according to a preset fixed time interval and the driving control cycle, and enter the next driving control cycle after the delay of the second dead time; determine in real time, if the control chip is in a DCM mode at present, whether a ZCD pin of the control chip detects a zero voltage; and enter, when the ZCD pin of the control chip detects the zero voltage, the next driving control cycle after a delay of a first preset time interval, thereby determining the second dead time based on the operating mode of the control chip.

Embodiment 3

The embodiment provides a driving control device for a GaN transistor, including:
a processor; and
a memory, storing a computer-readable program instruction therein.

The computer-readable program instruction executes, when run by the processor, the above driving control method in Embodiment 1.

Embodiment 4

The embodiment provides a computer-readable storage medium, which stores a computer program thereon. The computer program implements, when executed by a processor, steps of the driving control method in Embodiment 1.

Unless otherwise specified, all terms (including technical and scientific terms) used herein have the same meanings as those generally understood by those of ordinary skill in the art to which the present disclosure pertains. It should also be understood that terms such as those generally defined in dictionaries should be interpreted as having meanings consistent with the meanings in the context of the related art, and unless otherwise defined herein, these terms will not be explained in ideal or extremely formal meanings.

The above is an illustration of the present disclosure, and should not be construed as a limitation of the present disclosure. Although several exemplary embodiments of the present disclosure are described, those skilled in the art can easily understand that many modifications may be made to the exemplary embodiments without departing from the novel teachings and advantages of the present disclosure. Accordingly, all these modifications are intended to be included within the scope of the present disclosure as defined in the claims. It should be understood that the above is an illustration of the present disclosure and should not be construed as limited to the particular embodiments disclosed, and modifications of the disclosed embodiments and other embodiments are intended to be included within the scope of the appended claims. The present disclosure is defined by the claims and their equivalents.

What is claimed is:

1. A driving control circuit for a gallium nitride (GaN) transistor, comprising a flyback power supply circuit and an electronic switch, wherein the flyback power supply circuit comprises a control chip, a driving resistor, a GaN transistor and a current detection resistor; the control chip comprises a Driver pin and a current sense pin; the driving resistor comprises one terminal connected to the Driver pin, and the other terminal connected to a gate of the GaN transistor; a source of the GaN transistor is connected to the current sense pin and one terminal of the current detection resistor; and the other terminal of the current detection resistor is grounded;

the control chip further comprises an ADriver pin; and the electronic switch comprises a first terminal connected to the ADriver pin, a second terminal connected between the driving resistor and the GaN transistor, and a third terminal connected between the current detection resistor and the current sense pin; and during each driving control cycle of the GaN transistor, the following operation is performed:

the Driver pin of the control chip outputs a high level, and the ADriver pin outputs a low level; when a voltage on the current sense pin reaches a preset limit value, the Driver pin outputs a low level, and the ADriver pin outputs the low level; after a delay of first dead time, the Driver pin outputs the low level, and the ADriver pin outputs a high level; until a first preset time is reached, the Driver pin outputs the low level, and the ADriver pin outputs the low level; and a next driving control cycle is entered after a delay of second dead time.

2. The driving control circuit according to claim 1, wherein there are a 6 V voltage-stabilizing output module, a Driver driving module, a dead zone generating module and an ADriver driving module in the control chip; the 6 V voltage-stabilizing output module is connected to the Driver driving module and the dead zone generating module; the Driver driving module is connected to the dead zone generating module; the dead zone generating module is further connected to the ADriver driving module; the Driver driving module is connected to the Driver pin; and the ADriver driving module is connected to the ADriver pin.

3. The driving control circuit according to claim 2, wherein the preset limit value is a voltage value obtained after a voltage on an FB pin of the control chip is divided in the control chip.

4. The driving control circuit according to claim 1, wherein there are two operating modes for the control chip, comprising a continuous conduction mode and a discontinuous conduction mode; in response to the continuous conduction mode of the control chip, the first preset time is determined according to a preset fixed time interval from start time of the driving control cycle to the first preset time, and the second dead time is determined according to the preset fixed time interval and the driving control cycle; and in response to the discontinuous conduction mode of the control chip, the first preset time is time when an amplitude of oscillation detected by a zero-current detection pin of the control chip is greater than a preset amplitude of oscillation, and the second dead time is a sum of an interval from the first preset time to time when the zero-current detection pin of the control chip detects a zero voltage and a first preset time interval.

5. A driving control method for a gallium nitride (GaN) transistor, comprising:
performing the following operation during each driving control cycle of a GaN transistor:
controlling a Driver pin of a control chip to output a high level, and an ADriver pin to output a low level; controlling, until a voltage on a current sense pin of the control chip reaches a preset limit value, the Driver pin to output a low level, and the ADriver pin to output the low level; controlling, after a delay of first dead time, the Driver pin to output the low level, and the ADriver pin to output a high level; controlling, until a first preset time is reached, the Driver pin to output the low level, and the ADriver pin to output the low level; and entering a next driving control cycle after a delay of second dead time.

6. The driving control method according to claim 5, wherein the controlling, until a voltage on a current sense pin of the control chip reaches a preset limit value, the Driver pin to output a low level, and the ADriver pin to output the low level specifically comprises:
detecting the voltage on the current sense pin of the control chip in real time;
determining whether the voltage on the current sense pin reaches the preset limit value, the preset limit value being a voltage value obtained after a voltage on an FB pin of the control chip is divided in the control chip;
if yes, controlling the Driver pin to output the low level, and the ADriver pin to output the low level; and
if no, controlling the Driver pin of the control chip to output the high level, and the ADriver pin to output the low level.

7. The driving control method according to claim 5, after the controlling the Driver pin to output the low level, and the ADriver pin to output a high level, further comprising:
determining an operating mode of the control chip at present;
determining, if the control chip is in a continuous conduction mode at present, the first preset time according to a preset fixed time interval from start time of the driving control cycle to the first preset time; and
detecting in real time, if the control chip is in a discontinuous conduction mode at present, an amplitude of oscillation detected by a zero-current detection pin of the control chip, and determining whether the amplitude of oscillation is greater than a preset amplitude of oscillation, time when the amplitude of oscillation is greater than the preset amplitude of oscillation being the first preset time.

8. The driving control method according to claim 5, wherein the entering a next driving control cycle after a delay of second dead time specifically comprises:
determining an operating mode of the control chip at present;
determining, if the control chip is in a continuous conduction mode at present, the second dead time according to a preset fixed time interval and the driving control cycle, and entering the next driving control cycle after the delay of the second dead time; and
determining in real time, if the control chip is in a discontinuous conduction mode at present, whether a zero-current detection pin of the control chip detects a zero voltage; and entering, when the zero-current detection pin of the control chip detects the zero voltage, the next driving control cycle after a delay of a first preset time interval.

9. A driving control device for a gallium nitride (GaN) transistor, comprising:
a processor; and
a memory, storing a computer-readable program instruction therein, wherein the computer-readable program instruction executes, when run by the processor, the driving control method according to claim 5.

10. The driving control device for a gallium nitride (GaN) transistor according to claim 9, wherein the controlling, until a voltage on a current sense pin of the control chip reaches a preset limit value, the Driver pin to output a low level, and the ADriver pin to output the low level specifically comprises:
detecting the voltage on the current sense pin of the control chip in real time;
determining whether the voltage on the current sense pin reaches the preset limit value, the preset limit value being a voltage value obtained after a voltage on an FB pin of the control chip is divided in the control chip;
if yes, controlling the Driver pin to output the low level, and the ADriver pin to output the low level; and
if no, controlling the Driver pin of the control chip to output the high level, and the ADriver pin to output the low level.

11. The driving control device for a gallium nitride (GaN) transistor according to claim 9, after the controlling the Driver pin to output the low level, and the ADriver pin to output a high level, further comprising:
determining an operating mode of the control chip at present;
determining, if the control chip is in a continuous conduction mode at present, the first preset time according to a preset fixed time interval from start time of the driving control cycle to the first preset time; and detecting in real time, if the control chip is in a discontinuous conduction mode at present, an amplitude of oscillation detected by a zero-current detection pin of the control chip, and determining whether the amplitude of oscillation is greater than a preset amplitude of oscillation, time when the amplitude of oscillation is greater than the preset amplitude of oscillation being the first preset time.

12. The driving control device for a gallium nitride (GaN) transistor according to claim 9, wherein the entering a next driving control cycle after a delay of second dead time specifically comprises:

determining an operating mode of the control chip at present;

determining, if the control chip is in a continuous conduction mode at present, the second dead time according to a preset fixed time interval and the driving control cycle, and entering the next driving control cycle after the delay of the second dead time; and determining in real time, if the control chip is in a discontinuous conduction mode at present, whether a zero-current detection pin of the control chip detects a zero voltage; and entering, when the zero-current detection pin of the control chip detects the zero voltage, the next driving control cycle after a delay of a first preset time interval.

* * * * *